(12) United States Patent
Yamane et al.

(10) Patent No.: US 8,486,486 B2
(45) Date of Patent: Jul. 16, 2013

(54) METHOD OF MANUFACTURING MAGNETIC RECORDING MEDIUM AND MAGNETIC RECORDING AND REPRODUCING DEVICE

(75) Inventors: Akira Yamane, Ichihara (JP); Akira Sakawaki, Ichihara (JP); Masato Fukushima, Chiba (JP)

(73) Assignee: Showa Denko K.K., Tokyo (JP)

( * ) Notice: Subject to any disclaimer, the term of this patent is extended or adjusted under 35 U.S.C. 154(b) by 119 days.

(21) Appl. No.: 13/276,976

(22) Filed: Oct. 19, 2011

(65) Prior Publication Data

US 2012/0099222 A1    Apr. 26, 2012

(30) Foreign Application Priority Data

Oct. 22, 2010    (JP) .................................. 2010-237570

(51) Int. Cl.
*G11B 5/66* (2006.01)
(52) U.S. Cl.
USPC ........................................................ 427/127
(58) Field of Classification Search
USPC .................. 427/127, 128, 129, 130, 131, 132
See application file for complete search history.

(56) References Cited

U.S. PATENT DOCUMENTS

2009/0214896 A1* 8/2009 Nolan et al. .................. 428/832
2011/0104393 A1* 5/2011 Hilkene et al. ................ 427/526

FOREIGN PATENT DOCUMENTS

| JP | 05-205257 A | 8/1993 |
|---|---|---|
| JP | 2004-164692 A | 6/2004 |
| JP | 2004-178793 A | 6/2004 |
| JP | 2004-178794 A | 6/2004 |
| JP | 2006-209952 A | 8/2006 |
| JP | 2006-309841 A | 11/2006 |

* cited by examiner

*Primary Examiner* — Michael Cleveland
*Assistant Examiner* — Tabassom Tadayyon Eslami
(74) *Attorney, Agent, or Firm* — Sughrue Mion, PLLC

(57) ABSTRACT

A method of manufacturing a magnetic recording medium having a magnetically separated magnetic recording pattern is provided, in which the surface of a magnetic layer is not oxidized or halogenated, the surface is not contaminated with dust, and the manufacturing process is not complex. The method of manufacturing a magnetic recording medium having a magnetically separated magnetic recording pattern includes forming a magnetic layer on a nonmagnetic substrate, forming a mask layer made of carbon to form the magnetic recording pattern on the magnetic layer, forming cobalt carbide as a nonmagnetic material in the magnetic layer by irradiating a region of the magnetic layer not covered by the mask layer with ion beams including carbon hydride ions, and removing the mask layer in this order.

3 Claims, 2 Drawing Sheets

METHOD OF MANUFACTURING MAGNETIC RECORDING MEDIUM AND MAGNETIC RECORDING AND REPRODUCING DEVICE

BACKGROUND OF THE INVENTION

1. Field of the Invention

The present invention relates to a method of manufacturing a magnetic recording medium and a magnetic recording and reproducing device.

Priority is claimed on Japanese Patent Application No. 2010-237570, filed Oct. 22, 2010, the content of which is incorporated herein by reference.

2. Description of the Related Art

Recently, with the remarkable increase of the applicable scope of magnetic recording devices such as magnetic disk devices, flexible disk devices, magnetic tape devices, and the like, their importance has increased, and the remarkable improvement of the recording density of magnetic recording media used in such devices has been sought. In particular, since the introduction of MR heads and PRML technology, an increase in disk surface recording density has increased, and with the recent further introduction of GMR heads, TMR heads, and the like, the increase is continuing at a rate of about 50% per year.

With respect to these magnetic recording media, achievement of higher recording density is required in the future, and in order to achieve this requirement, achievement of high coercivity, high signal-to-noise ratio (SNR), and high resolution of a magnetic layer is necessary. Furthermore, with the recent improvement of line recording densities, there have been efforts to increase the surface recording density by increasing the track density.

In the most up-to-date magnetic recording device, the track density has reached 320 kTPI. However, when the track density is increased, the magnetic recording information between neighboring tracks could interfere with each other, and this causes problems in that a magnetization transition region of their boundary region serves as a noise source, tending to damage the SNR. Since this directly leads to worsening of the bit error rate, it may affect the improvement of the recording density.

Furthermore, in order to increase the surface recording density, it is necessary to further miniaturize the size of respective recording bits on the magnetic recording medium, and to secure a saturation magnetization and magnetic film thickness as large as possible in the respective recording bits. However, when the recording bits are miniaturized, minimum magnetization volume per one bit becomes smaller, and a problem may occur in that recorded data disappears due to magnetization reversal caused by thermal fluctuations.

Furthermore, since the distance between tracks is short, extremely high precision tracking servo technology is required for the magnetic recording device, and, on the other hand, a method of performing a wide range of recording and performing a narrower range of reproduction than the recording in order to eliminate the influence of the neighboring track as much as possible has been generally used. This method has the problem in that although the influence between the tracks can be suppressed to a minimum, it is difficult to sufficiently obtain the reproduction output, and thus it is difficult to secure sufficient SNR.

As a method for solving the above-described problems of heat fluctuations and securing the SNR and the sufficient output, attempts to increase the track density by physically separating the recording tracks from each other by forming of concavo-convexes along the tracks on the surface of the recording medium have been made. Hereinafter, such technology is called a discrete track method, and a magnetic recording medium manufactured by the method is called a discrete track medium.

Furthermore, attempts to manufacture so-called patterned media, in which a data region in the same track is further divided, have been made.

As an example of a discrete track medium, a magnetic recording medium, in which the magnetic recording medium is formed on a nonmagnetic substrate on which a concavo-convex pattern is formed, and a physically separated magnetic recording track and a servo signal pattern are formed thereon, is known (for example, refer to JP-A-2004-164692).

This magnetic recording medium is formed in a manner in which a ferromagnetic layer is formed on the surface of the substrate, on which plural concavo-convexes are formed, through a soft magnetic film, and a protection layer is formed on the surface of the ferromagnetic layer. According to this magnetic recording medium, a magnetic recording region that is physically separated from the surroundings is formed on a convex region.

According to this magnetic recording medium, since the occurrence of magnetic domain walls on the soft magnetic layer can be suppressed, it is difficult for the influence of the heat fluctuations to occur. Furthermore, since there is no interference between neighboring signals, a high-density magnetic recording medium having low noise can be formed.

The discrete track method may be a method of forming a track after forming a magnetic recording medium that is formed of several thin film layers or a method of forming a thin film of a magnetic recording medium after forming a concavo-convex pattern directly on the surface of the substrate in advance or on a thin film layer to form the track (for example, refer to JP-A-2004-178793 and JP-A-2004-178794).

Furthermore, a method of forming a region between magnetic tracks of the discrete track medium with the magnetic characteristic of the region changed by injecting ions of nitride, oxygen, and the like or irradiating a laser onto a pre-formed magnetic layer has been disclosed (refer to JP-A-5-205257, JP-A-2006-209952, and JP-A-2006-309841).

As described above, in manufacturing the so-called discrete track media or patterned media having a magnetically separated magnetic recording pattern, the method of forming the magnetic recording pattern may include (1) the method of forming the magnetic recording pattern by reforming the magnetic characteristic of the magnetic layer through exposing a part of the magnetic layer to reactive plasma using oxygen or halogen or reactive ions, and (2) the method of forming the magnetic recording pattern through processing of a part of the magnetic layer by ion milling and smoothing the surface by filling of a nonmagnetic material in the processed places.

The above-described manufacturing method (1) has the advantages in that since it is not required to physically process the magnetic layer, less dust occurs, and thus it is easy to obtain a clear and smooth surface. However, the manufacturing method (1) has the disadvantages in that the surface of the magnetic layer is oxidized or halogenated. Furthermore, corrosion of the magnetic recording medium (migration of magnetic particles such as cobalt that are included in the magnetic layer) occurs, starting from the oxidized or halogenated region.

Furthermore, the manufacturing method (2) has problems in that since the magnetic layer is processed, dust occurs and the surface of the magnetic recording medium is contaminated. Furthermore, the manufacturing method (2) has problems in that dust is attached to the surface during the processing, and due to this, the smoothness of the surface of the magnetic recording medium is deteriorated. Furthermore, the manufacturing method (2) has problems in that it is required to fill the nonmagnetic material in the processed place of the magnetic layer, and thus the manufacturing process is complex.

SUMMARY OF THE INVENTION

The present invention has been made to solve the above-mentioned problems occurring in the related art, and an object of the present invention is to provide a method of manufacturing a magnetic recording medium on which a magnetic recording pattern is formed, which can further improve the magnetic separation performance in a state where the surface of a magnetic layer is not oxidized or halogenated, the surface is not contaminated with dust, and the manufacturing process is not complex.

The present invention provides the following means.

(1) A method of manufacturing a magnetic recording medium having a magnetically separated magnetic recording pattern, which includes forming a magnetic layer on a nonmagnetic substrate; forming a mask layer made of carbon to form the magnetic recording pattern on the magnetic layer; forming cobalt carbide as a nonmagnetic material in the magnetic layer by irradiating a region of the magnetic layer that is not covered by the mask layer with ion beams including carbon hydride ions; and removing the mask layer in this order.

(2) In the method of manufacturing a magnetic recording medium as described in (1), 80 atom % or more of the total amount of cobalt in the region of the magnetic layer that is not covered by the mask layer is cobalt carbide.

(3) In the method of manufacturing a magnetic recording medium as described in (1) or (2), the ion beams do not include halogen.

(4) A magnetic recording and reproducing device, which includes a magnetic recording medium obtained by the manufacturing method as described in any one of (1) to (3), and a magnetic head that records and reproduces information on the magnetic recording medium.

According to the invention, since the ions including the carbon hydride ions are used as the ion beams, non-magnetization of an ion irradiation portion of the magnetic layer can be performed with high efficiency.

Furthermore, according to the invention, since the magnetic recording pattern of the magnetic recording medium is formed of cobalt carbide as a nonmagnetic material, the reliability of the magnetic separation of the magnetic recording pattern is improved.

Furthermore, according to the invention, since carbon is used as the mask layer and the ions including the carbon hydride ions are used in ion beam irradiation, the mask layer and the injected ions are similar materials, and thus masses and sizes of atoms and molecules thereof are similar to each other. Accordingly, during the irradiation of the ion beams, the mask layer is scarcely damaged, and thus the shielding of the mask layer is improved. Furthermore, since the boundary between the cobalt carbide forming region and the non-forming region becomes clear, it becomes possible to clearly form the magnetic recording pattern.

Furthermore, according to the invention, since the ion beams do not include halogen and are reductive, no halogenide is generated on the magnetic layer, and the magnetic layer is not oxidized. Accordingly, while the magnetic recording medium is in contact with the atmosphere, corrosion stating from the halogenide does not occur, and the magnetic layer is not oxidized in the process of manufacturing the magnetic recording medium.

DETAILED DESCRIPTION OF THE INVENTION

Hereinafter, a method of manufacturing a magnetic recording medium according to an embodiment of the invention will be described with reference to the accompanying drawings.

A magnetic recording medium according to an embodiment of the invention has a structure in which a soft magnetic layer, an intermediate layer, a magnetic layer on which a magnetic pattern is formed, and a protection film are laminated on the surface of a nonmagnetic substrate, and a lubricating film is further formed on the surface thereof. However, layers except for the nonmagnetic substrate and the magnetic layer may be provided, if need.

Figure 1:
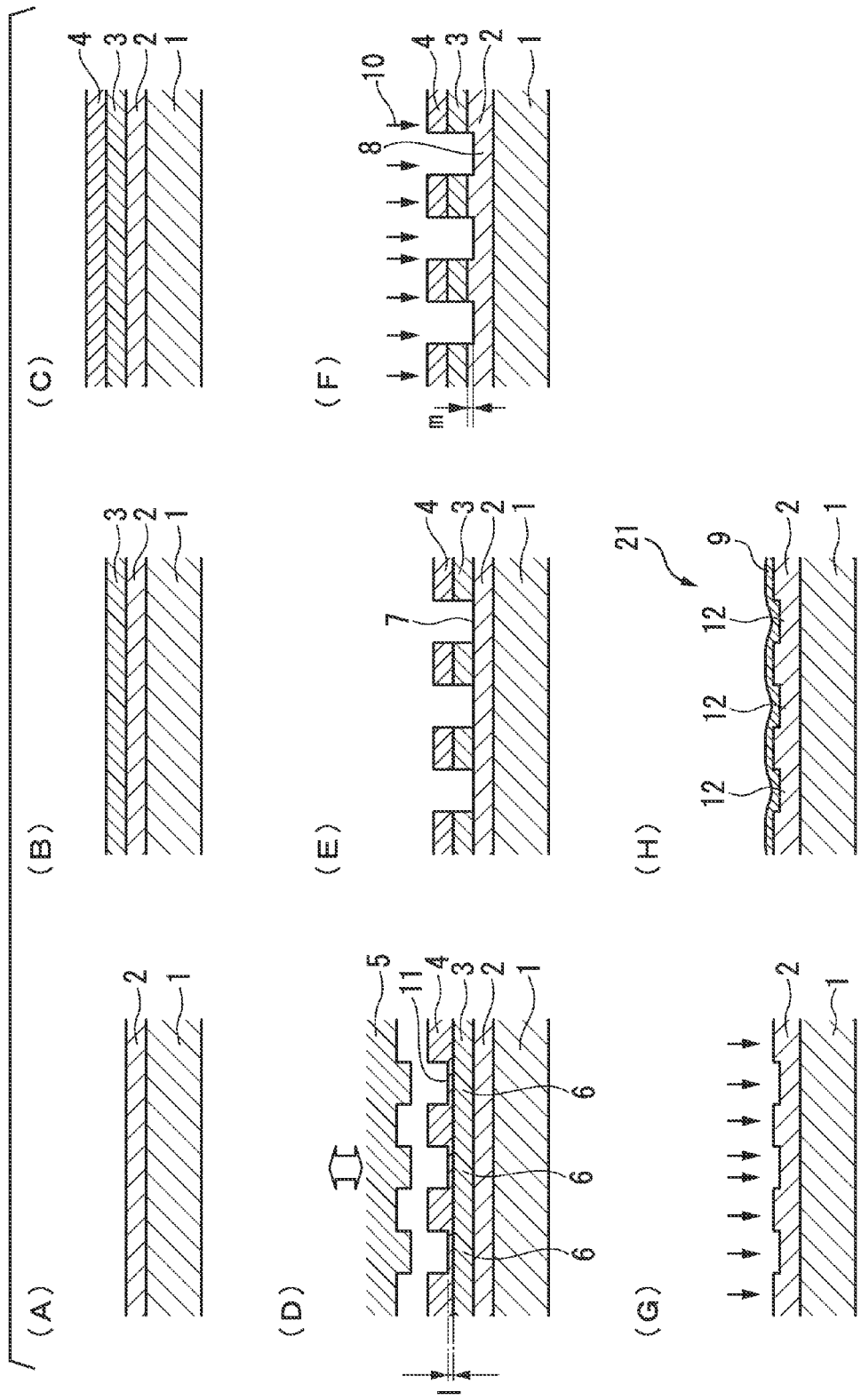
FIG. 1 is sectional process views illustrating a method of manufacturing a magnetic recording medium according to an embodiment of the invention.

The method of manufacturing a magnetic recording medium according to an embodiment of the invention, as illustrated in FIG. 1, includes a process A of forming a magnetic layer 2 on a nonmagnetic substrate 1, a process B of forming a mask layer 3 on the magnetic layer 2, a process C of forming a resist layer 4 on the mask layer 3, a process D of transferring a negative pattern of a magnetic recording pattern to the resist layer 4 using a stamp 5, a process E of removing a region 6 of the mask layer 3 that corresponds to the negative pattern of the magnetic recording pattern, a process F of forming the magnetic recording pattern by forming cobalt carbide as a nonmagnetic material in the magnetic layer 2 through irradiation of ion beams from the surface of the resist layer 4 to a region 7 of the magnetic layer 2 that is not covered by the mask layer 3, a process G of removing the resist layer 4 and the mask layer 3 by dry etching, and a process H of covering the surface of the magnetic layer 2 with a protection film 9 in this order. Hereinafter, details of the above-described processes will be described.

First, the magnetic layer 2 is formed on the nonmagnetic substrate 1 (process A).

Generally, although a sputtering method is used as the method of forming the magnetic layer 2, any appropriate method may be used.

As the nonmagnetic substrate 1 used in this embodiment, any nonmagnetic substrate, such as an Al alloy substrate having Al as a main component, for example, of Al—Mg alloy or the like, and a substrate made of typical soda glass, aluminosilicate system glass, crystallized glasses, silicon, titanium, ceramics, or various kinds of resins, may be used. Among them, it is preferable to use the Al alloy substrate, the glass substrate such as crystallized glass or the like, or the silicon substrate.

Furthermore, an average surface roughness (Ra) of the substrates is preferably equal to or smaller than 1 nm, more preferably equal to or smaller than 0.5 nm, and most preferably equal to or smaller than 0.1 nm.

Furthermore, the magnetic layer 2 that is formed on the nonmagnetic substrate 1 in this embodiment may be an in-plane magnetic layer or a vertical magnetic layer, but in order to realize higher recording density, the magnetic layer is preferably the vertical magnetic layer. It is preferable that the magnetic layers 2 are formed of alloys having Co as their main components.

As the magnetic layer 2 for an in-plane magnetic recording medium, for example, a laminated structure composed of a nonmagnetic CrMo ground layer and a ferromagnetic CoCrPtTa magnetic layer may be used.

As the magnetic layer 2 for the vertical magnetic recording medium, for example, lamination of an underlayer (soft magnetic layer) made of a soft magnetic FeCo alloy (FeCoB, FeCoSiB, FeCoZr, FeCoZrB, FeCoZrBCu, or the like), a FeTa alloy (FeTaN, FeTaC, or the like), and a Co alloy (CoTaZr, CoZrNB, CoB, or the like), an orientation control film such as Pt, Pd, NiCr, NiFeCr, and the like, an intermediate film such as Ru or the like, if necessary, and a recording layer made of a 70Co-15Cr-15Pt alloy or a 70Co-5Cr-15Pt-10$SiO_2$ alloy may be used.

In the thickness range of the recording layer, the lower limit thereof is preferably 3 nm, and more preferably 5 nm, and the upper limit thereof is preferably 20 nm, and more preferably 15 nm.

Furthermore, the recording layer may be formed so that sufficient head input/output can be obtained according to the kind and the laminated structure of the magnetic alloys to be used.

It is necessary that the film thickness of the recording layer is equal to or larger than a specified thickness in order to obtain an output over a predetermined level during reproduction, and since it is customary that various parameters that indicate recording and reproduction characteristics are deteriorated together with the increase in the output, it is necessary to set the optimum film thickness.

Next, the mask layer 3 is formed on the magnetic layer 2 (process B).

In an embodiment of the present disclosure, carbon is used as the mask layer 3. Furthermore, although the mask layer 3 can be formed by a sputtering method or a CVD method, it is particularly preferable to use the CVD method in order to form a more highly dense mask layer 3.

The film thickness of the mask layer 3 is preferably in the range of 5 nm to 40 nm, and more preferably in the range of 10 nm to 30 nm.

If the film thickness of the mask layer 3 is thinner than 5 nm, the corner portion of the mask layer 3 has a rounded shape, and the processing accuracy of the magnetic layer 2 becomes deteriorated. Furthermore, in a process F to be described later, ions that penetrate the resist layer 4 and the mask layer 3 inject the magnetic layer 2 to deteriorate the patterning accuracy of the magnetic layer 2.

On the other hand, if the mask layer 3 becomes thicker than 40 nm, in a process E to be described later, time that is necessary for etching the mask layer 3 is lengthened to deteriorate the productivity.

Furthermore, residual materials are likely to remain on the surface of the magnetic layer 2 when the mask layer 3 is etched.

Furthermore, in a process G to be described later, the mask layer 3 that is made of carbon can be easily etched by dry etching. Accordingly, the residual materials due to the dry etching are reduced, and thus the contaminant on the surface of the magnetic recording medium 21 can be reduced.

Next, after the mask layer 3 is formed, the resist layer 4 is formed on the mask layer 3 (process C), and a negative pattern of a magnetic recording pattern is transferred to the resist layer 4 using a stamp 5 (process D).

At this time, it is preferable that the thickness 1 of a portion 11 that corresponds to the negative pattern of the resist layer 4 after the negative pattern of the magnetic recording pattern is transferred to the resist layer 4 is set to be within the range of 0 to 10 nm.

By setting the thickness 1 of the portion 11 of the resist layer 4 to be in the range, sagging of the edge portion of the mask layer 3 is eliminated in the etching process (process E) of the mask layer 3. Accordingly, the shielding for ion milling of the mask layer 3 is improved, and the formation characteristics of the magnetic recording pattern by the mask layer 3 is improved.

Furthermore, it is preferable that the resist layer 4 is made of a material having curability through radiation irradiation, and the resist layer 4 is irradiated with radiation in the process of transferring the pattern onto the resist layer 4 using the stamp 5 or after the pattern transferring process.

Here, the radiation is electromagnetic waves of a broad concept, such as heat rays, visible rays, ultraviolet rays, X-rays, gamma rays, and the like. Furthermore, the material having curability through the radiation irradiation, for example, is thermoset resin with respect to the heat rays, and ultraviolet-curable resin with respect to the ultraviolet rays.

Using the above-described manufacturing method, it becomes possible to transfer the shape of the stamp 5 onto the resist layer 4 with high accuracy, and sagging of the edge portion of the mask layer 3 is eliminated in the etching process (process E) of the mask layer 3. Accordingly, the shielding for ion milling of the mask layer 3 is improved, and the formation characteristics of the magnetic recording pattern by the mask layer 3 is improved.

In particular, the stamp 5 is pressed onto the resist layer 4 in a state where the resist layer 4 has high liquidity, and the radiation is irradiated while pressing the stamp 5 to cure the resist layer 4. Thereafter, by separating the stamp 5 from the resist layer 4, the shape of the stamp 5 can be transferred onto the resist layer 4 with high accuracy.

As the method of irradiating the radiation onto the resist layer 4 while pressing the stamp 5 onto the resist layer 4, a method of irradiating the radiation from an opposite side of the stamp 5, that is, from the side of the nonmagnetic substrate 1, a method of selecting a material that the radiation can penetrate as the material of the stamp 5 and irradiating the radiation from the side of the stamp 5, a method of irradiating the radiation from the side surface of the stamp 5, and a method of using the radiation having high conductivity with respect to a solid body such as heat rays and irradiating the radiation by the thermal conductivity from the material of the stamp 5 or the nonmagnetic substrate 1 may be used.

Furthermore, it is preferable that novolac resin or ultraviolet-curable resin such as acrylate esters or alicyclic epoxies is used as the material of the resist layer 4, and glass or resin having high permeability is used with respect to the ultraviolet rays is used as the material of the stamp 5.

Furthermore, the stamp 5, in which a fine track pattern may be formed on a metal plate using electron-beam lithography or the like, may be used and the material of the stamp 5 requires hardness and durability enough to endure the process. For example, Ni or the like may be used, but any material which meets the above-described purpose can be used. On the stamp 5, servo signal patterns such as a bust pattern, a gray pattern, or a preamble pattern may be formed in addition to a track for recording typical data.

After the negative pattern of the magnetic recording pattern is transferred onto the resist layer 4, the portion 11 that corresponds to the negative pattern of the resist layer 4 and the portion 6 that corresponds to the negative pattern of the mask layer 3 are removed by etching (process E).

Thereafter, ion beams 10 including carbon hydride ions are irradiated from the surface of the side of the resist layer 4 onto the portion 7 of the magnetic layer 2 where the mask layer 3 is not covered. Accordingly, ions including the carbon hydride ions are injected into the portion 7 of magnetic layer 2 to form cobalt carbide as a nonmagnetic material (process F).

In this case, an upper layer portion of the magnetic layer 2 may be slightly removed by the ion injection including the carbon hydride ions. If the depth (m) of the removal becomes larger than 15 nm, the surface smoothness of the magnetic recording medium becomes worse, and thus the levitation characteristic of the magnetic head when the magnetic recording and reproducing device is manufactured becomes worse.

As the carbon hydride ions injected by the ion beams 10, for example, $CH^{4+}$, $CH^{3+}$, $CH^{2+}$, or $CH^{+}$ may be used. Furthermore, it is preferable that the formation amount of the cobalt carbide by the irradiation of the ion beams 10 is 80 atom % or more of the total amount of cobalt of the lower layer portion 8 of the magnetic layer 2 that is the ion injection portion. If the amount of the cobalt carbide is less than 80 atom %, the non-magnetization becomes insufficient, which is not preferable.

Furthermore, as the accelerated voltage range of the ion beams 10, the lower limit thereof is preferably 0.3 keV, more preferably 0.45 keV, and most preferably 0.8 keV, and the upper limit thereof is preferably 3.5 keV, more preferably 2.5 keV, and most preferably 2.2 keV.

If the accelerated voltage is lower than 0.3 keV, the injection depth of the carbon hydride ions becomes smaller to cause problems. Furthermore, if the accelerated voltage is higher than 3.5 keV, the mask tolerance becomes poor to cause problems.

As the ion injection time to the magnetic layer by the ion beams, the lower limit thereof is preferably 1 second and more preferably 5 seconds, and the upper limit thereof is preferably 120 seconds and more preferably 90 seconds.

Through the above-described processes, the magnetic layer 2 having the magnetically separated magnetic recording pattern is formed. As the magnetically separated magnetic recording pattern is formed, write bleeding when the magnetic recording medium is magnetically recorded is eliminated, and thus the magnetic recording medium having high surface recording density can be provided.

Thereafter, the resist layer 4 and the mask layer 3 are removed by dry etching (process G), and the surface of the magnetic layer 2 is covered with a protection film 9 (process H).

Although the dry etching is used to remove the resist layer 4 and the mask layer 3 in this embodiment, a reactive ion etching, ion milling, or wet etching technique may also be used.

Furthermore, although the protection film 9 is formed by a method of forming a thin film of diamond like carbon using P-CVD or the like, the forming of the protection film 9 is not particularly limited thereto.

As the protection film 9, a carbonaceous layer, such as carbon (C), hydrogenated carbon ($H_xC$), carbon nitrogen (CN), amorphous carbon, and silicon carbide (SiC), or a typically used protection film material, such as $SiO_2$, $Zr_2O_3$, and TiN, may be used.

Furthermore, two or more protection layers 9 may be formed.

However, it is necessary to set the film thickness of the protection film 9 to be less than 10 nm. If the film thickness of the protection film 9 exceeds 10 nm, the distance between the head and the magnetic layer 2 is lengthened, and thus sufficient strength of the input/output signals may not be obtained.

In this embodiment, it is preferable to form a lubricating layer on the protection film 9. Lubricants used on the lubricating layer may be fluorine-based lubricants, hydrocarbon-based lubricants, or their mixtures, and the lubricating layer is formed generally with a thickness of 1 to 4 nm.

Through the above-described process, the magnetic recording medium 21 on which the magnetically separated magnetic recording pattern is formed is obtained.

Furthermore, magnetically separated magnetic recording pattern in this embodiment indicates a state where the magnetic layer 2 is separated by the nonmagnetic area 12 as seen from the surface of the magnetic recording medium. That is, as seen from the surface of the magnetic recording medium, if the magnetic layer 2 is separated by cobalt carbide as the nonmagnetic material formed in the area 12, the bottom portion of the magnetic layer 2 is not required to be separated, and falls into the concept of the magnetically separated magnetic recording pattern.

Furthermore, according to the magnetic recording pattern in this embodiment, it is not required for the area 12 to be completely nonmagnetic. That is, if the magnetic head can read and write on the magnetic recording pattern unit, the magnetically separated magnetic recording pattern can be formed, even if the area slightly has coercivity and saturation magnetization.

Furthermore, the magnetic recording pattern in this embodiment includes so-called patterned media in which the magnetic recording pattern is arranged with a constant regularity for each bit, media in which the magnetic recording pattern is arranged in the form of a track, a servo signal pattern, and the like.

Among them, in particular, it is preferable from the convenience in manufacturing to apply the magnetically separated magnetic recording pattern to the so-called discrete magnetic recording medium in which the magnetically separated magnetic recording pattern is the magnetic recording track and servo signal pattern.

In this embodiment, a process of irradiating ion beams 10 onto the portion 7 of the magnetic layer 2 that is not covered by the mask layer 3 and non-magnetizing the magnetic characteristic of the irradiated portion 7 is adopted. Accordingly, a magnetic recording medium, in which the surface is clean and a smooth, can be obtained.

Furthermore, since the ions including the carbon hydride ions are used as the ion beams 10, carbonization of cobalt that is included in the magnetic layer 2 can be performed with high efficiency.

Furthermore, since the cobalt carbide as a nonmagnetic material is formed in the ion injection portion of the magnetic layer 2, magnetic separation of the magnetic recording pattern can be secured.

Furthermore, since the carbon hydride ions that are used for ion bean irradiation have high activity, it is easy to form the cobalt carbide, and the reliability of the magnetic separation of the magnetic recording pattern can be further improved.

Furthermore, since the mask layer 3 and the injected ions are similar materials, masses and sizes of atoms and molecules thereof are similar to each other. Accordingly, during the irradiation of the ion beams, since the mask layer 3 is scarcely damaged, the shielding of the mask layer 3 is improved, and it becomes possible to clearly form the magnetic recording pattern.

Furthermore, since carbon used to form the mask layer 3 is easily etched by dry etching using the reactive gas, the residual materials are reduced during the dry etching (process G), and thus the contaminants on the surface of the magnetic recording medium can be reduced.

Furthermore, since the ion beams do not include oxygen and halogen, the magnetic layer 2 is not oxidized or halogenated. In particular, since the halogen is not included, no halogenide is generated and thus corrosion stating from the halogenide does not occurs, while the magnetic recording medium is in contact with the atmosphere.

Figure 2:
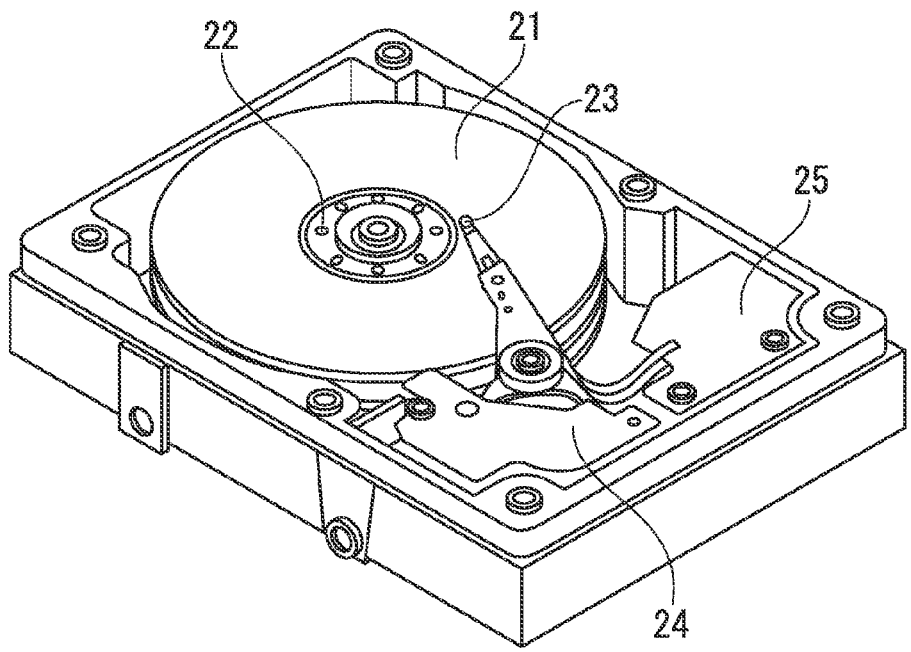
FIG. 2 is a schematic view illustrating an example of a magnetic recording and reproducing device to which a magnetic recording medium manufactured by a manufacturing method according to an embodiment of the invention is applied.

FIG. 2 illustrates an example of a magnetic recording and reproducing device that uses the above-described magnetic recording medium.

The magnetic recording and reproducing device illustrated in FIG. 2 includes the above-described magnetic recording medium 21, a medium driving unit 22 driving the magnetic recording medium 21 in the recording direction, a magnetic head 23 including a recording unit and a reproducing unit, a head driving unit 24 making the magnetic head 23 perform relative motion with respect to the magnetic recording medium 21, and a recording and reproducing signal system 25 combining a recording signal processing means for inputting a signal to the magnetic head 23 and a reproducing signal processing means for performing reproduction of an output signal from the magnetic head 23.

Through the adoption of the above-described construction, it becomes possible to obtain a magnetic recording device having high recording density.

In the related art, in order to exclude the influence of the magnetization transition region of the track edge portion, the width of the reproducing head is set to be narrower than the width of the recording head. In contrast, by processing the recording track of the magnetic recording medium 21 with magnetic discontinuity, both heads can be operated with almost the same width. Accordingly, sufficient reproduction output and high SNR can be obtained.

Furthermore, by constructing the reproducing unit of the magnetic head 23 with a GMR head or a TMR head, sufficient signal strength can be obtained even at high recording density, and the magnetic recording device having high recording density can be realized.

Furthermore, the floating quantity of the magnetic head 23 is 0.005 µm to 0.020 µm, in which the magnetic head 23 is floated with a height that is lower than that in the related art, the output is improved to obtain high device SNR, and thus a large-capacity and high-reliability magnetic recording device can be provided. Furthermore, by combining the signal processing circuit by maximum-likelihood decoding, the recording density can be much more improved.

According to the invention, non-magnetization of an ion irradiation portion of the magnetic layer can be performed with high efficiency. Furthermore, the reliability of the magnetic separation of the magnetic recording pattern is improved.

According to the invention, during the irradiation of the ion beams, the mask layer is scarcely damaged, and thus the shielding of the mask layer is improved. Furthermore, since the boundary between the cobalt carbide forming region and the non-forming region becomes clear, it becomes possible to clearly form the magnetic recording pattern. Moreover, while the magnetic recording medium is in contact with the atmosphere, corrosion stating from the halogenide does not occur, and the magnetic layer is not oxidized in the process of manufacturing the magnetic recording medium.

Therefore, the present invention has an industrial applicability.

EXAMPLE

Hereinafter, an example is shown, and the invention will be concretely described.

A vacuum chamber in which an HD glass substrate was set was evacuated in advance at $1.0 \times 10^{-5}$ Pa or less. The glass substrate used therein was made of crystallized glass having components of $Li_2Si_2O_5$, $Al_2O_3$—$K_2O$, $Al_2O_3$—$K_2O$, $MgO$—$P_2O_5$, and $Sb_2O_3$—$ZnO$. The glass substrate had an outer diameter of 65 mm and an inner diameter of 20 mm, and the average surface roughness (Ra) was 2 Å.

On this glass substrate, using a DC sputtering method, thin films were laminated in the order of FeCoB as a soft magnetic layer, Ru as an intermediate layer, and 70Co-5Cr-15Pt-10SiO$_2$ alloy as a recording layer to form a magnetic layer. The film thicknesses of the respective layers were set to the FeCoB soft magnetic layer of 60 nm, the Ru intermediate layer of 10 nm, and the recording layer of 15 nm.

On the recording layer, the mask layer was formed using a sputtering method. Carbon was used for the mask layer, and the film thickness thereof was 20 nm.

Then, on the mask layer, a resist layer was formed through coating of resist by a spin-coating method. As the resist, novolac resin as an ultraviolet-curable resin was used. Furthermore, the film thickness thereof was 60 nm.

Next, a stamp made of glass having a negative pattern of the magnetic recording pattern was pressed onto the resist layer with a pressure of 1 MPa (about 8.8 kgf/cm$^2$). In this state, the resist was cured by irradiating ultraviolet rays having a wavelength of 250 nm for 10 seconds from the upper portion of the glass stamp having ultraviolet transmittance of 95% or more. Thereafter, the stamp was separated from the resist layer, and the magnetic recording pattern was transferred. According to the magnetic recording pattern transferred onto the resist layer, a convex portion of the resist layer was circumferential with a width of 64 nm, and a concave portion of the resist layer (a portion corresponding to the negative pattern) was circumferential with a width of 30 nm. The thickness of the convex portion of the resist layer was 65 nm, and the thickness of the concave portion of the resist layer was about 15 nm. Furthermore, the angle of the concave portion of the resist layer to the substrate surface was almost 90°.

Thereafter, the portion that corresponded to the negative patterns of the resist layer and the mask layer were removed by dry etching. The dry etching conditions for the resist layer were O$_2$ gas of 40 sccm, pressure of 0.3 Pa, high-frequency plasma power of 300 W, DC bias of 30 W, and etching time of 10 seconds. The dry etching conditions for the mask layer were O$_2$ gas of 50 sccm, pressure of 0.6 Pa, high-frequency plasma power of 500 W, DC bias of 60 W, and etching time of 30 seconds.

Thereafter, ion beams including carbon hydride ions were irradiated onto the surface of a portion of the recording layer that was not covered by the mask layer. The carbon hydride ions were generated by RF plasma using a mixed gas in which methane gas and hydrogen gas were mixed in the ratio of 10:1. Furthermore, $CH^{4+}$, $CH^{3+}$, $CH^{2+}$, $CH^+$, $C^+$, and $H^+$ ions of the plasma were confirmed by emission spectroscopy of the generated RF plasma, and a signal intensity ratio of $CH^{4+}$, $CH^{3+}$, $CH^{2+}$, and $CH^+$ ions to $C^+$ and $H^+$ ions was adjusted to be heightened through adjustment of the RF input power. Using the carbon hydride ions, the ion beams having injection energy of 1.1 keV and a dose amount of $2.8 \times 10^{16}$ atoms/cm$^2$ were formed. The ion injection time to the recording layer by the ion beams was set to 30 seconds.

By a preliminary experiment using the magnetic recording medium on which the mask layer was not provided, it was confirmed that the saturation magnetization (Ms) of the recording layer became 0.8% of the saturation magnetization before the ion injection due to carbonization of Co that was included in the recording layer through the ion injection.

Thereafter, the resist layer and the mask layer were removed by dry etching, a carbon protection film was formed on the surface with a thickness of 4 nm by the CVD method, and then lubricant was coated to a thickness of 1.5 nm to manufacture the magnetic recording medium.

The electromagnetic conversion characteristics (SNR and 3T-squash) and a head flying height (glide avalanche) of the magnetic recording medium manufactured in the above-described method were measured.

The evaluation of the electromagnetic conversion characteristics was performed using a spin stand. In this case, as heads for evaluation, a vertical recording head was used for recording, a TuMR head was used for reading, and the SNR value and the 3T-squash when a signal of 750 kFCI was recorded were measured.

The 3T-squash (triple-track squash) indicates signal deterioration of the center track when both adjacent tracks are written. The numerical value can be expressed by (Remaining signal strength Vp–p)/(Original signal strength Vp–p)×100 (%). The closer this value is to 100%, the stronger the resistance to writing on the adjacent tracks is.

According to the manufactured magnetic recording medium, the RW characteristics were excellent with regards to the SNR of 13.8 dB and the 3T-squash of 89%, and the head flying characteristic was stable. That is, the smoothness of the surface of the magnetic recording medium was high, and the separation characteristics between tracks of the magnetic layer by the nonmagnetic unit were excellent.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of manufacturing a magnetic recording medium having a magnetically separated magnetic recording pattern, comprising:
    forming a magnetic layer on a nonmagnetic substrate;
    forming a mask layer made of carbon to form the magnetic recording pattern on the magnetic layer;
    forming cobalt carbide as a nonmagnetic material in the magnetic layer by irradiating a region of the magnetic layer that is not covered by the mask layer with ion beams including carbon hydride ions; and
    removing the mask layer in this order.

2. The method of manufacturing a magnetic recording medium according to claim 1, wherein 80 atom % or more of the total amount of cobalt in the region of the magnetic layer that is not covered by the mask layer is cobalt carbide.

3. The method of manufacturing a magnetic recording medium according to claim 1, wherein the ion beams do not include a halogen.

* * * * *